(12) United States Patent
Takane et al.

(10) Patent No.: US 7,524,433 B2
(45) Date of Patent: Apr. 28, 2009

(54) FERRITE MATERIAL

(75) Inventors: Shin Takane, Tokyo (JP); Takuya Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 207 days.

(21) Appl. No.: 11/133,810

(22) Filed: May 19, 2005

(65) Prior Publication Data

US 2005/0258393 A1 Nov. 24, 2005

(30) Foreign Application Priority Data

May 21, 2004 (JP) .............................. 2004-151310

(51) Int. Cl.
*H01F 1/34* (2006.01)
(52) U.S. Cl. .................... 252/62.6; 252/62.62
(58) Field of Classification Search ................ 252/62.6, 252/62.62
See application file for complete search history.

(56) References Cited

U.S. PATENT DOCUMENTS 5,618,464 A * 4/1997 Nakagawa et al. ......... 252/62.6

FOREIGN PATENT DOCUMENTS

| EP | 0891955 | 1/1999 |
|---|---|---|
| JP | 05-326242 | 12/1993 |
| JP | 05-326243 (3147496) | 12/1993 |
| JP | 07-257966 | * 10/1995 |
| JP | 07-257969 | * 10/1995 |
| JP | 09-306716 | 11/1997 |
| JP | 2000-277318 | 10/2000 |
| JP | 2000-306719 | 11/2000 |
| JP | 2001-006916 | 1/2001 |
| JP | 2003-068516 | 3/2003 |
| JP | 2003-068517 | 3/2003 |
| JP | 2003-321272 | 11/2003 |

* cited by examiner

*Primary Examiner*—C. Melissa Koslow
(74) *Attorney, Agent, or Firm*—Hogan & Hartson LLP

(57) ABSTRACT

The temperature properties of the initial permeability of a Ni—Cu—Zn based ferrite material are improved while the degradation of the magnetic properties of the ferrite material is being suppressed. The ferrite material is formed of a sintered body comprising, as main constituents, $Fe_2O_3$: 47.0 to 50.0 mol %, CuO: 0 to 7 mol %, NiO: 13 to 26 mol %, and ZnO substantially constituting the balance, wherein the sintered body comprises 40 ppm or less of P in terms of $P_2O_5$ and 50 to 1800 ppm of one or more additives of $Al_2O_3$, CaO and MgO in relation to the sum of the contents of the main constituents. In the Ni—Cu—Zn based ferrite material, the mean grain size can be set at 12 μm or less and the standard deviation of the grain size can be set at 4.5 μm or less.

9 Claims, 13 Drawing Sheets

FERRITE MATERIAL

BACKGROUND OF THE INVENTION

1. Field of the Invention

The present invention relates to a Ni—Cu—Zn based ferrite material, in particular, a Ni—Cu—Zn based ferrite material which has a permeability stable against the temperature variation in the use environment.

2. Description of the Related Art

Ni—Cu—Zn based ferrite materials are widely used, for example, as cores for inductors and transformers, and as cores to remove noises for portable appliances such as cellular phones and notebook-size personal computers. Portable appliances are used in various environments because of the portability thereof. Accordingly, the components constituting a portable appliance are required to be highly resistant to environmental variations, and particularly important is the resistance thereof to temperature variation. This is because temperature is varied depending on the season and additionally varied largely depending on the site where the appliance is used. As for the Ni—Cu—Zn based ferrite materials, it is important that the permeability is stable against the temperature variation.

Various proposals have hitherto been presented for Ni—Cu—Zn based ferrite materials.

For example, Japanese Patent No. 3147496 (Patent Document 1) discloses, as a ferrite material which is scarcely affected by the stress such as contraction force of the resin in molding with resin and suitable for applying to laminated ferrite parts and formed (molded) ferrite parts, a ferrite material comprising $Fe_2O_3$: 46.5 to 49.5 mol %, CuO: 5.0 to 12.0 mol %, ZnO: 2.0 to 30.0 mol %, NiO: the balance, wherein the ferrite material is further blended with $Co_3O_4$, $Bi_2O_3$, $SiO_2$ and $SnO_2$ in contents of $Co_3O_4$: 0.05 to 0.60 wt % and $Bi_2O_3$: 0.50 to 2.00 wt %, and in a combined content of $SiO_2$ and $SnO_2$: 0.10 to 2.00 wt % (exclusive of the case where either $SiO_2$ or $SnO_2$ is 0 wt %) in relation to the Ni—Zn—Cu based ferrite material.

Additionally, Japanese Patent Laid-Open No. 9-306716 (Patent Document 2) discloses a ferrite sintered body which is high in saturation magnetic flux density and small in the temperature coefficient of the initial permeability, wherein the sintered body comprises as main constituents $Fe_2O_3$, NiO, ZnO and CuO, and is added with at least one of PbO and $H_3BO3$ in a content of 0.00211 to 0.00528 mol % or $Bi_2O_3$ in a content of 0.00101 to 0.00253 mol %, and at least one of $SiO_2$, $Cr_2O_3$, $Al_2O_3$, $SnO_2$ and $WO_3$ in a content of 0.00392 to 0.00982 mol %, when the sum of the contents of the main constituents is represented as 100 mol %.

Moreover, Japanese Patent Laid-Open No. 2001-6916 (Patent Document 3) discloses a low-loss oxide magnetic material as a low-loss oxide magnetic material having attained a low power loss, wherein the material comprises as main constituents 43 to 50 mol % of $Fe_2O_3$, 10 to 40 mol % of NiO, 1 to 15 mol % of CuO and ZnO constituting the balance, and comprises as additive(s) 0.005 to 0.1 wt % of at least one of CaO, $Cr_2O_3$, MgO, $Al_2O_3$ and $P_2O_5$.

[Patent Document 1] Japanese Patent No. 3147496
[Patent Document 2] Japanese Patent Laid-Open No. 9-306716
[Patent Document 3] Japanese Patent Laid-Open No. 2001-6916

SUMMARY OF THE INVENTION

Although the ferrite material disclosed in Patent Document 1 has a resistance against the effect of stress, no consideration is made for use environment, particularly, the resistance against temperature variation.

The ferrite material disclosed in Patent Document 2 is proposed for the purpose of overcoming a problem borne by conventional ferrite materials such that when an inductor material is made higher in magnetic flux density, the temperature coefficient of the initial permeability is concomitantly increased; the ferrite material concerned takes as its object the development of a material high in saturation magnetic flux density and small in the temperature coefficient of the initial permeability. However, the ferrite material disclosed in Patent Document 2 is observed to exhibit degradation of the saturation magnetic flux density ascribable to the contained additives.

In the ferrite material disclosed in Patent Document 3, the mean grain size of the sintered body is set at 5 μm or more and the porosity rate inside the sintered body is made larger for the purpose of lowering the power loss. However, such a low-density material results in extreme lowering of magnetic properties such as permeability and saturation magnetic flux density.

The present invention has been achieved in view of such technical problems as described above, and takes as its object to provide a ferrite material which can suppress the degradation of the magnetic properties and simultaneously improve the temperature properties of the permeability.

The present inventor has investigated the content of P contained in the Ni—Cu—Zn based ferrite material for the purpose of achieving the above described object, and consequently has found that by decreasing the content of P, the magnetic properties, particularly, the initial permeability and the saturation magnetic flux density can be improved, and the temperature properties of the permeability can also be improved; and by adding one or more of $Al_2O_3$, MgO and CaO in a predetermined content to a Ni—Cu—Zn based ferrite material which has been reduced in the content of P, the temperature properties of the permeability can further be improved. The ferrite material of the present invention based on the above described findings is formed of a sintered body comprising, as main constituents, $Fe_2O_3$: 47.0 to 50.0 mol %, CuO: 0 to 7 mol %, NiO: 13 to 26 mol %, and ZnO substantially constituting the balance, wherein the sintered body comprises 40 ppm or less of P in terms of $P_2O_5$ and 50 to 1800 ppm of one or more additives of $Al_2O_3$, CaO and MgO in relation to the sum of the contents of the main constituents.

The ferrite material of the present invention has the above described composition and accordingly can have a fine and uniform structure in which the mean grain size of the sintered body is 12 μm or less and the standard deviation of the grain size is 4.5 μm or less. It is understood that the fact that the ferrite material of the present invention can suppress the degradation of the magnetic properties thereof and simultaneously can improve the temperature properties of the initial permeability is ascribable to such a fine and uniform crystalline structure.

The ferrite material of the present invention can simultaneously have the following properties:

the initial permeability μi (at 100 kHz): 320 or more, the absolute value of $\alpha\mu i r_{-40\ to\ 20}$: 13 ppm/° C. or less, the absolute value of $\alpha\mu i r_{20\ to\ 100}$: 22 ppm/° C. or less, and the saturation magnetic flux density Bs (applied magnetic field: 4000 A/m): 470 mT or more, where $$\alpha\mu i r_{-40\ to\ 20} = [(\mu i_{20} - \mu i_{-40})/\mu i_{20}^2] \times [1/(T_{20} - T_{-40})],$$

$$\alpha\mu i r_{20\ to\ 100} = [(\mu i_{100} - \mu i_{20})/\mu i_{20}^2] \times [1/(T_{100} - T_{20})],$$

$\mu i_{-40}$: the initial permeability at $-40°$ C.,
$\mu i_{20}$: the initial permeability at $20°$ C., and
$\mu i_{100}$: the initial permeability at $100°$ C.

According to the present invention, while the degradation of the magnetic properties is being suppressed, the temperature properties of the initial permeability can be improved.

DETAILED DESCRIPTION OF THE PREFERRED EMBODIMENTS

Figure 1:
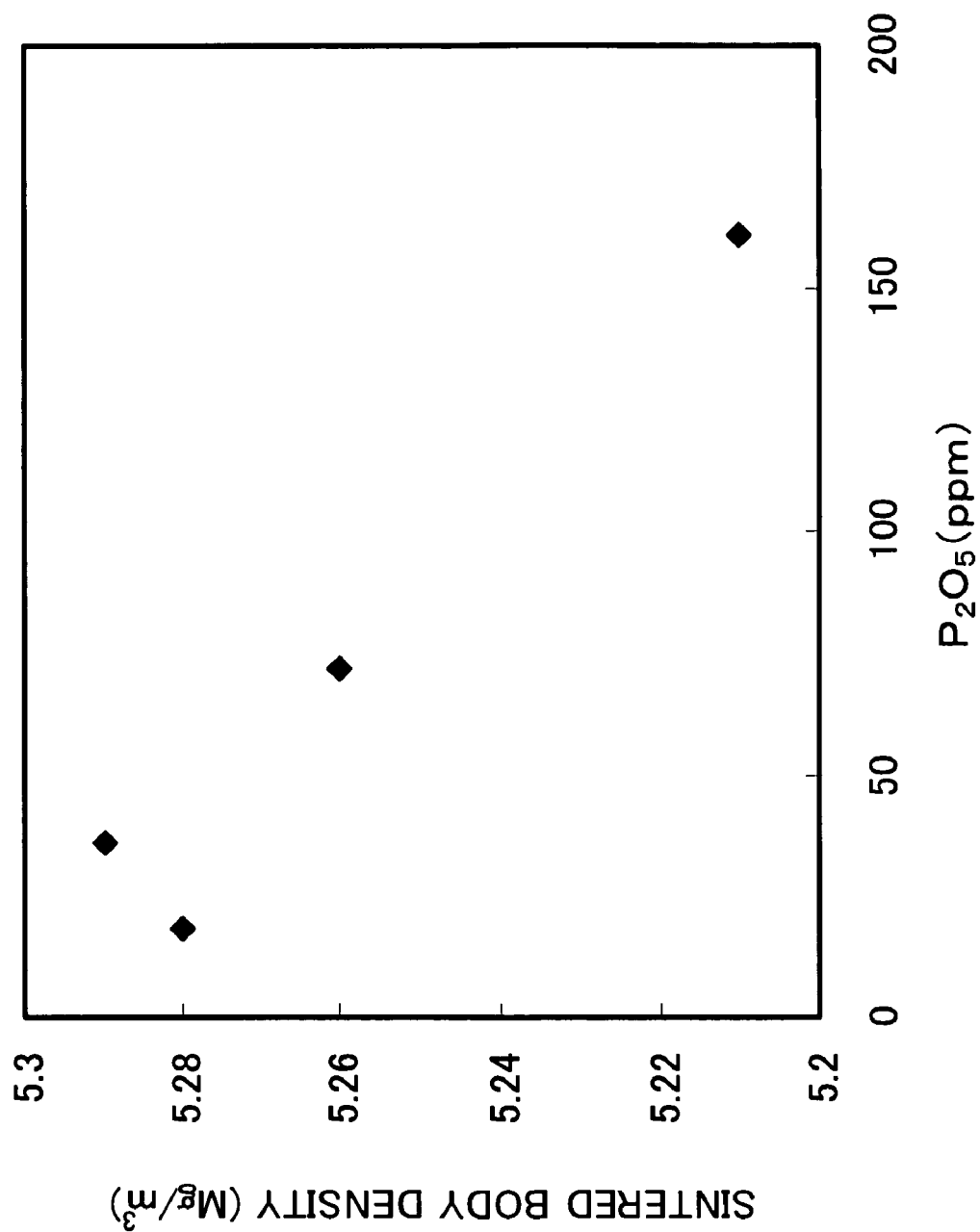
FIG. 1 is a graph showing the relation between the content of $P_2O_5$ in a sintered body and the sintered body density.

Now, the present invention will be described below in detail on the basis of the embodiments.

<Main Constituents>

The ferrite material of the present invention is formed of a sintered body comprising, as main constituents, $Fe_2O_3$: 47.0 to 50.0 mol %, CuO: 0 to 7 mol %, NiO: 13 to 26 mol %, and ZnO substantially constituting the balance.

When the content of $Fe_2O_3$ is less than 47.0 mol %, no high saturation magnetic flux density can be obtained. On the other hand, when the content of $Fe_2O_3$ exceeds 50.0 mol %, the specific resistance inappropriately decreases to lower the insulation properties of the Ni—Cu—Zn based ferrite material. Accordingly, in the ferrite material of the present invention, the content of $Fe_2O_3$ as a main constituent is set at 47.0 to 50.0 mol %, and is preferably 47.0 to 49.8 mol %, and more preferably 47.5 to 49.8 mol %.

Next, when the content of CuO exceeds 7 mol %, the saturation magnetic flux density decreases. Accordingly, in the ferrite material of the present invention, the content of CuO as a main constituent is set at 7 mol % or less (inclusive of 0), and is preferably 5 mol % or less (inclusive of 0), and more preferably 1 to 4 mol %.

When the content of NiO is less than 13 mol %, the saturation magnetic flux density decreases, while when the content of NiO exceeds 26 mol %, the initial permeability $\mu i$ decreases, and the temperature properties of the initial permeability, $\alpha\mu ir$ (hereinafter, simply referred to "$\alpha\mu ir$" as the case may be) is degraded. Accordingly, in the ferrite material of the present invention, the content of NiO as a main constituent is set at 13 to 26 mol %, and is preferably 15 to 26 mol %, and more preferably 20 to 26 mol %.

<$P_2O_5$>

In the ferrite material of the present invention, the content of P in the sintered body is set at 40 ppm or less in terms of $P_2O_5$. This is because when the content of $P_2O_5$ exceeds 40 ppm, both the permeability and the saturation magnetic flux density decrease, and the temperature properties of the initial permeability are also degraded. The content of $P_2O_5$ is preferably 35 ppm or less, and more preferably 30 ppm or less. As will be shown in the examples to be described later, $\alpha\mu ir$ is satisfactory where the content of $P_2O_5$ is 30 ppm or less, even if additives (one or more of $Al_2O_3$, MgO and CaO) in a predetermined content are not contained. It is to be noted that the content of P is essentially concerned with the present invention. Since the content of P is conventionally represented in terms of the oxide, however, the content of P is represented in terms of $P_2O_5$ in the present invention.

P is contained as an impurity in $Fe_2O_3$, a raw material of the ferrite material. In this connection, no Ni—Cu—Zn based ferrite material has hitherto been proposed in which the content of $P_2O_5$ is reduced to such a level as set in the present invention. This is because raw materials with a reduced content of $P_2O_5$ are high in cost, and additionally no remarkable effects of reducing the content of $P_2O_5$ have been found for Ni—Cu—Zn based ferrite materials. The above described effects provided by reducing the content of $P_2O_5$, which have not hitherto been found, have been for the first time found by the present invention. The effects concerned are extremely significant for portable appliances to be used in environments subjected to large temperature variations.

<Additives>

The ferrite material of the present invention may comprise as additives one or more of $Al_2O_3$, MgO and CaO in a content of 50 to 1800 ppm. $Al_2O_3$, MgO and CaO are effective in improving the temperature properties of the initial permeability. In order to achieve this effect, it is important for the ferrite material to comprise one or more of $Al_2O_3$, MgO and CaO in a content of 50 ppm or more. It is to be noted that when the content concerned is too large, the initial permeability is degraded, and the temperature properties of the initial permeability are also degraded. Accordingly, the content of one or more of $Al_2O_3$, MgO and CaO is set at 1800 ppm or less. The content of one or more of $Al_2O_3$, MgO and CaO falls in a range preferably between 100 and 1500 ppm, and more preferably between 200 and 1200 ppm.

The content of $Al_2O_3$ falls in a range preferably between 100 and 1500 ppm, and more preferably between 300 and 1000 ppm, furthermore preferably between 400 and 800 ppm.

The content of MgO falls in a range preferably between 100 and 1500 ppm, and more preferably between 300 and 1000 ppm, furthermore preferably between 400 and 800 ppm.

The content of CaO falls in a range preferably between 100 and 1500 ppm, and more preferably between 300 and 1000 ppm, furthermore preferably between 400 and 800 ppm.

Inclusion of one or more of $Al_2O_3$, MgO and CaO decreases the saturation magnetic flux density as will be shown in the examples to be described later. Consequently, inclusion of solely one or more of $Al_2O_3$, MgO and CaO can hardly solve the problems of the present invention. Thus, the present invention takes as a prerequisite thereof the improvement effect of the saturation magnetic flux density based on the reduction of the content of $P_2O_5$.

<Structure of the Sintered Body>

The ferrite material of the present invention is normally embodied as a sintered body. In the ferrite material of the present invention, the content of $P_2O_5$ is reduced, and additionally the ferrite material comprises a predetermined content of one or more of $Al_2O_3$, MgO and CaO; thus the grains constituting the sintered body becomes fine and uniform in size. More specifically, there can be obtained a structure in which the mean grain size falls within the range of 12 µm or less, and the standard deviation of the grain size is 4.5 µm or less. Such a controlled structure makes it possible to improve the temperature properties of the initial permeability. The mean grain size is preferably 10 µm or less, and the standard deviation of the grain size is preferably 4.3 µm or less, more preferably 4.0 µm or less.

The ferrite material of the present invention is preferably a substantially dense sintered body. When the density of the sintered body is low, the magnetic properties including initial permeability and the saturation magnetic flux density become poor. The sintered body constituting the ferrite material of the present invention has preferably a density of 5.20 Mg/m$^3$ or more, and more preferably a density of 5.25 Mg/m$^3$ or more.

Next, a preferable production method of a ferrite material according to the present invention will be described below in the order of the production steps.

As raw material powders to be main constituents, for example, $Fe_2O_3$ powder, CuO powder, ZnO powder and NiO powder are prepared. In addition to these powders to be the main constituents, one or more of $Al_2O_3$ powder, MgO powder and CaO powder are prepared to be additives. Because the ferrite material of the present invention comprises $P_2O_5$ in a content of 40 ppm or less, it is necessary to prepare a raw material powder small in the content of $P_2O_5$. Among the raw material powders, the $Fe_2O_3$ powder is a main supply source of $P_2O_5$, and accordingly it is preferably to use a $Fe_2O_3$ powder small in the content of $P_2O_5$, more specifically, a $Fe_2O_3$ powder with a $P_2O_5$ content of 20 ppm or less.

The particle size of each of the raw material powders to be prepared is recommended to be appropriately selected so as to fall within a range between 0.1 and 10 µm. The prepared raw material powers are subjected to wet mixing by use of, for example, a ball mill. The mixing operation depends on the operation conditions of the ball mill; usually, mixing for about 20 hours is sufficient to attain a uniformly mixed condition. One or more of $Al_2O_3$, MgO and CaO powders to be additive powders may be added in the wet mixing, and may also be added after the calcination to be described later.

It is to be noted that in the present invention, the main constituent raw material powders are not limited to those described above, but complex oxide powders containing two or more metals may be used as raw materials used as main constituents. For example, an aqueous solution containing ferric chloride and Ni chloride is subjected to oxidizing roasting, so as to obtain a complex oxide powder containing Fe and Ni. This complex oxide powder may be mixed with a ZnO powder to prepare a main constituent raw material. In such a case, the calcination described below is not necessary.

After mixing the raw material powders, the mixture thus obtained is calcined. The calcination may be carried out under the conditions that the retention temperature falls within a range between 700 and 950° C. and the atmosphere is the air. The calcined substance obtained by the calcination is disintegrated, and then subjected to wet milling with a ball mill until the mean particle size reaches a range between about 0.5 and 2.0 µm.

The milled powder comprising the main constituents and additives is preferably granulated to smoothly carry out the following compacting step. A suitable binder such as polyvinyl alcohol (PVA) is added in a small amount to the milled powder, and the mixture may be sprayed and dried with a spray dryer to obtain granules. The particle size of the granules to be obtained preferably falls within a range between about 60 and 200 µm.

The obtained granules are compacted into a desired form, using a press equipped with a die with a predetermined shape. The obtained compacted body is then sintered in the sintering step. In the sintering, the compacted body is retained in a range between 900 and 1280° C., and preferably in a range between 1150 and 1240° C. The sintering may be carried out in the air.

EXAMPLE

Raw materials of $Fe_2O_3$ different in the content of P were used. $Fe_2O_3$, CuO, ZnO and NiO were weighed so as to give a composition consisting of $Fe_2O_3$: 49.6 mol %, CuO: 2.5 mol %, ZnO: 24.0 mol %, and NiO constituting the balance. The weighed materials were added with a predetermined amount of ion-exchanged water as a solvent and subjected to wet mixing for 16 hours with a steel ball mill. The mixed powder thus obtained was calcined with a top temperature of 900° C. for 2 hours by using a heating furnace, and subjected to furnace cooling, and then disintegrated by using a 30-mesh sieve. The disintegrated calcined substance was finely milled for 16 hours with a predetermined amount of ion-exchanged water as solvent by using a steel ball mill. The finely milled substance in a slurry form was dried and disintegrated. Each of the finely milled powders obtained in this way was added with a 6% aqueous solution of polyvinyl alcohol as binder in a content of 10 wt % to obtain a ferrite granule material. The ferrite granule material was cast into a die and pressed by applying a molding pressure of 200 MPa to yield a ferrite compacted body. The obtained ferrite compacted body was sintered at sintering temperatures between 1150 and 1240° C. to yield a ferrite sintered body by using a heating furnace.

The content of $P_2O_5$ in each of the obtained ferrite sintered bodies was measured by means of the fluorescence X-ray spectroscopic method. The density and magnetic properties (the initial permeability µi and the temperature properties thereof, and the saturation magnetic flux density Bs) of each of the obtained ferrite sintered bodies were measured according to the methods described below, and the results thus obtained are shown in Table 1 and FIGS. 1 to 4.

Density of a sintered body: The weight of a ferrite sintered body having a T10 shape (toroidal of 20 mm in outside diameter, 10 mm in inside diameter, and 5 mm in thickness) is measured. The volume of the ferrite sintered body was derived from the outside diameter, inside diameter and thickness, and the sintered body density was derived from this volume and the measured weight.

Initial permeability µi and αµir (the temperature properties of the initial permeability) : A ferrite sintered body having a T10 shape (toroidal) was wound with 20 turns of wire, and then the initial permeability μi of the sintered body at 100 kHz was measured by means of a LCR meter (HP4192 manufactured by Hewlett Packard, Inc.), and αμir in a range between −40° C. and 100° C. was derived on the basis of the following formula:

$$\alpha\mu ir = [(\mu i_2 - i_1)/\mu i_{20}^2] \times [1/(T_2 - T_1)]$$

where $\mu i_1$: The initial permeability at a temperature of $T_1$,
$\mu i_2$: The initial permeability at a temperature of $T_2$, and
$\mu i_{20}$: The initial permeability at 20° C.

Saturation magnetic flux density Bs: Measured at an applied magnetic field of 4000 A/m.

TABLE 1

| Sample No. | $P_2O_5$ (ppm) | Sintered body density (Mg/m³) | μi | Bs (mT) | αμir(ppm/° C.) −40° C. to 20° C. | αμir(ppm/° C.) 20° C. to 100° C. |
|---|---|---|---|---|---|---|
| 1 | 161 | 5.21 | 221 | 465 | 38.0 | 89.1 |
| 2 | 72 | 5.26 | 287 | 469 | 27.2 | 61.7 |
| 3 | 36 | 5.29 | 336 | 474 | 13.6 | 24.3 |
| 4 | 18 | 5.28 | 341 | 479 | 12.3 | 23.9 |

As can be seen from Table 1 and FIG. 1, the sintered body density is decreased with increasing content of $P_2O_5$.

Figure 2:
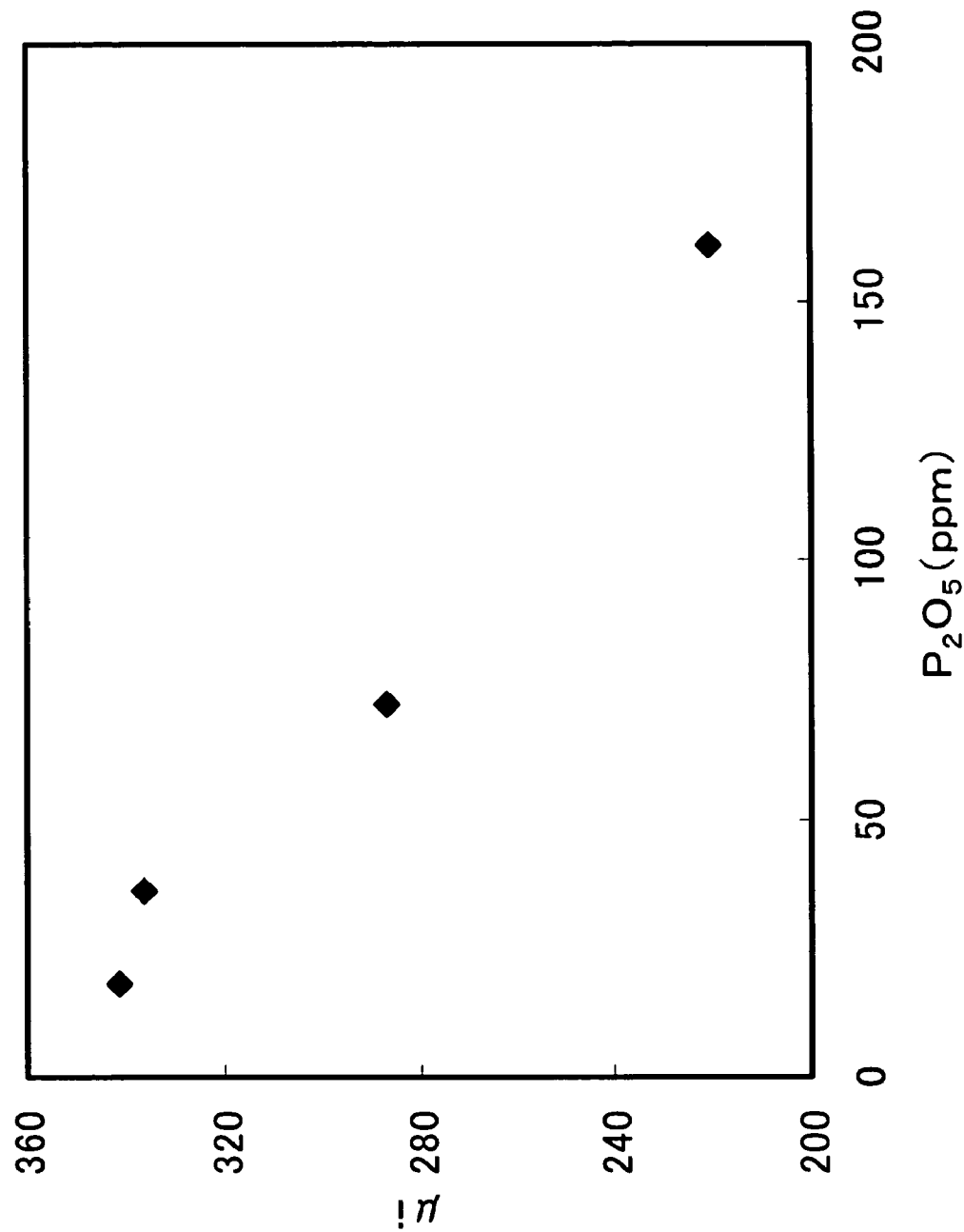
FIG. 2 is a graph showing the relation between the content of $P_2O_5$ in the sintered body and the initial permeability $\mu i$.
Figure 3:
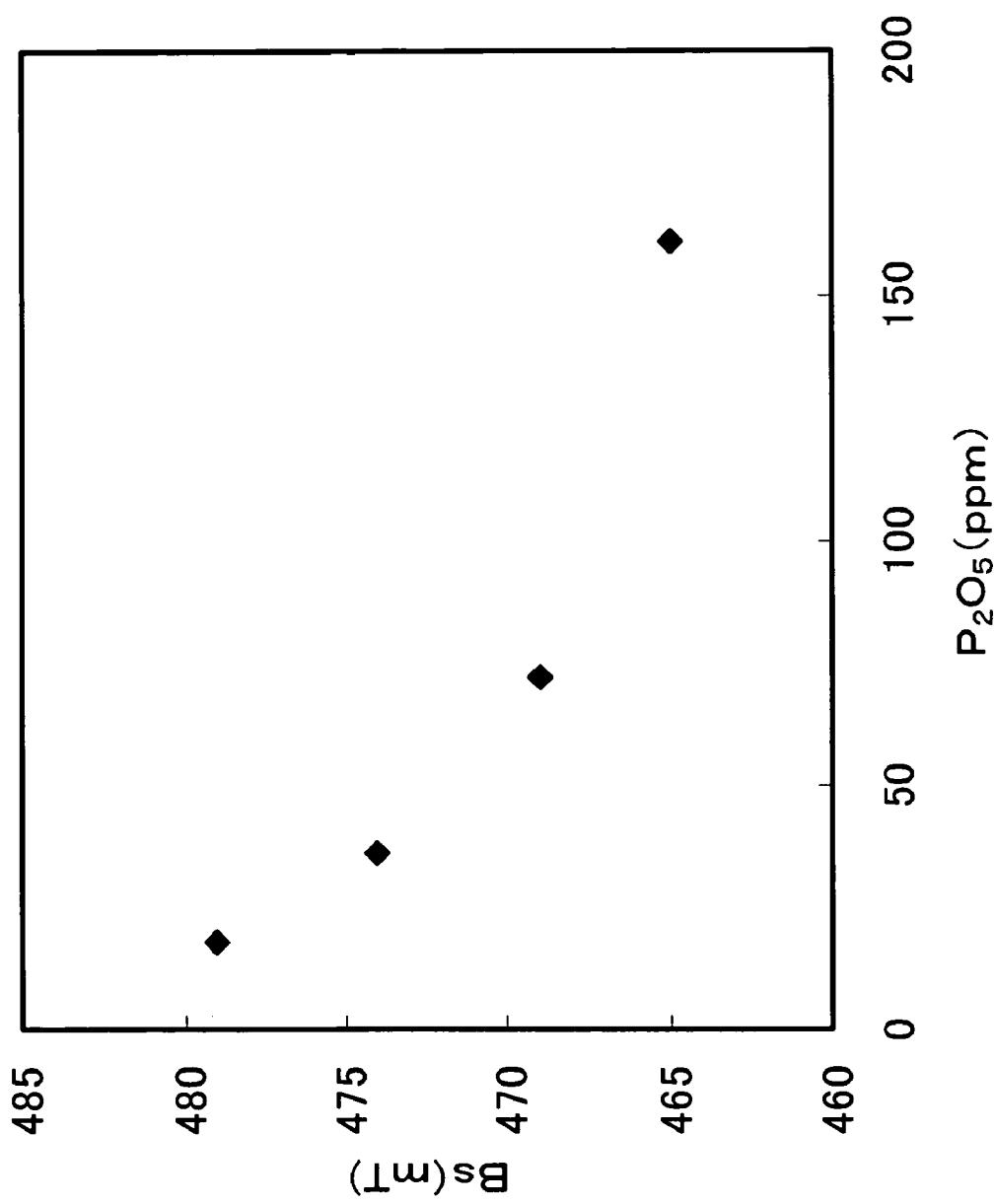
FIG. 3 is a graph showing the relation between the content of $P_2O_5$ in the sintered body and the saturation magnetic flux density Bs.
Figure 4:
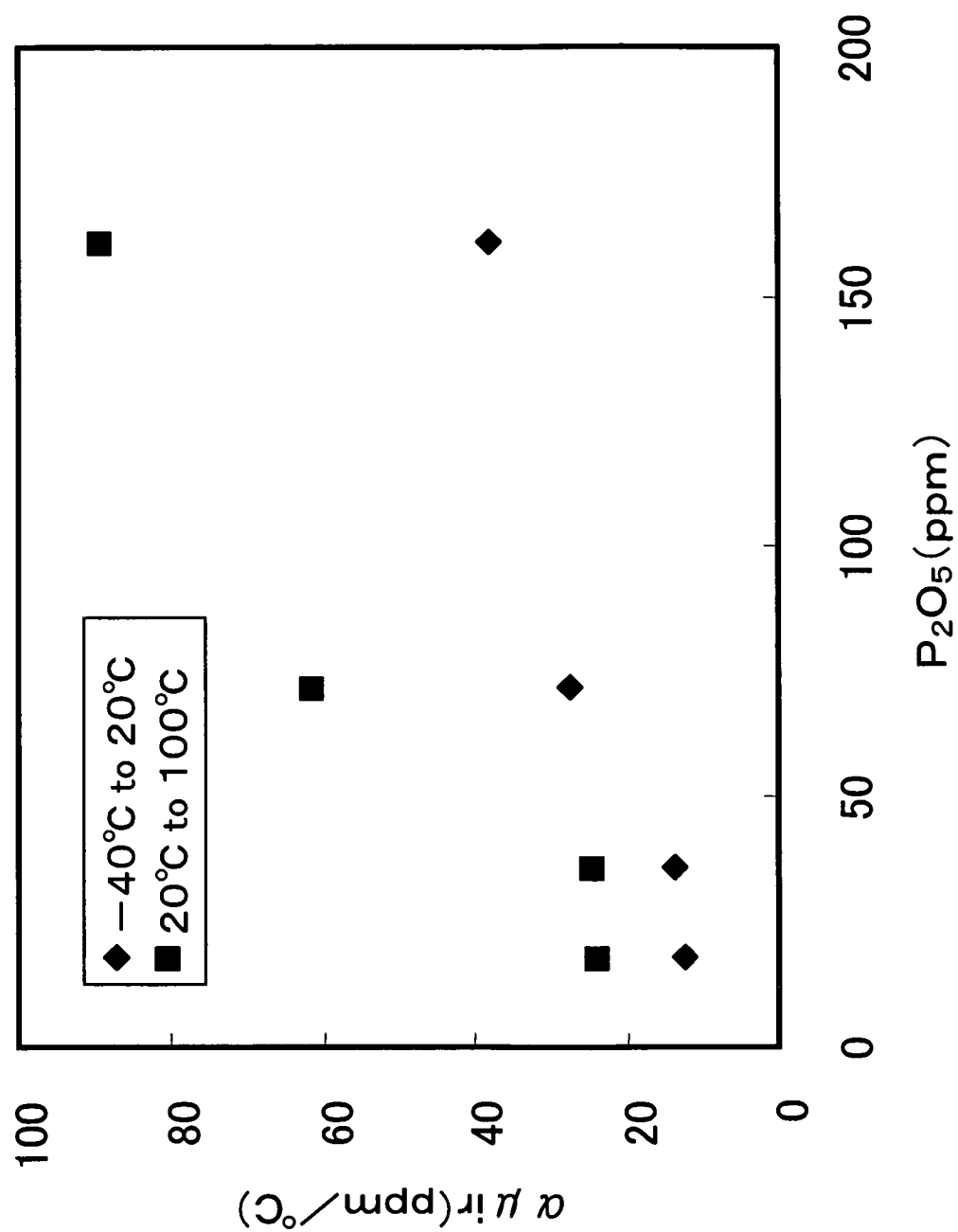
FIG. 4 is a graph showing the relation between the content of $P_2O_5$ in the sintered body and the temperature properties of the initial permeability $\alpha\mu ir$.

As can also be seen from Table 1 and FIGS. 2 and 3, the initial permeability μi and the saturation magnetic flux density Bs are improved with decreasing content of $P_2O_5$. As can be seen from Table 1 and FIG. 4, αμir increase with an increase in content of $P_2O_5$; however, when the content of $P_2O_5$ is 40 ppm or less, the αμir value is stable in such a way that the αμir value is approximately 14 ppm/° C. in the temperature range between −40° C. and 20° C., and is approximately 23 ppm/° C. in the temperature range between 20° C. and 100° C.

On the basis of these results, in the present invention, the content of $P_2O_5$ is set at 40 ppm or less. If the content of $P_2O_5$ is set at 30 ppm or less as in Sample No. 4, it can enjoy the improvement in temperature properties of the initial permeability while an initial permeability μi of 340 or more and a saturation magnetic flux density Bs of 470 mT or more are obtained.

Next, the raw material of $Fe_2O_3$ used for preparation of sample No. 4 was used. $Fe_2O_3$, CuO, ZnO and NiO were weighed so as to give a composition consisting of $Fe_2O_3$: 49.6 mol %, CuO: 2.5 mol %, ZnO: 24.0 mol %, and NiO constituting the balance. The weighed materials were added with a predetermined amount of ion-exchanged water as solvent and subjected to wet mixing for 16 hours with a steel ball mill. The mixed powder thus obtained was calcined with a top temperature of 900° C. for 2 hours by using a heating furnace, and subjected to furnace cooling, and then disintegrated by using a 30-mesh sieve. The disintegrated calcined substance was added with predetermined amounts of $Al_2O_3$, CaO and MgO, then finely milled for 16 hours with a predetermined amount of ion-exchanged water as a solvent by using a steel ball mill. The finely milled substance in a slurry form was dried and disintegrated. Each of the finely milled powders obtained in this way was added with a 6% aqueous solution of polyvinyl alcohol as a binder in a content of 10 wt % to obtain a ferrite granule material. The ferrite granule material was cast into a die and pressed by applying a molding pressure of 200 MPa to yield a ferrite compacted body. The obtained ferrite compacted body was sintered at sintering temperatures between 1150 and 1240° C. to yield a ferrite sintered body by using a heating furnace.

The contents of $P_2O_5$, $Al_2O_3$, CaO and MgO in each of the obtained ferrite sintered bodies were measured by means of the fluorescence X-ray spectroscopic method. The density and magnetic properties (the initial permeability μi and the temperature properties thereof, and the saturation magnetic flux density Bs) of each of the obtained ferrite sintered bodies were measured in the same manner as described above, and the results thus obtained are shown in Tables 2 to 4 and FIGS. 5 to 9.

TABLE 2

| Sample No. | $Al_2O_3$ (ppm) | Sintered body density (Mg/m³) | μi | Bs (mT) | αμir(ppm/° C.) −40° C. to 20° C. | αμir(ppm/° C.) 20° C. to 100° C. |
|---|---|---|---|---|---|---|
| 5 | 4369 | 5.24 | 296 | 467 | 26.4 | 73.5 |
| 6 | 2403 | 5.27 | 315 | 469 | 20.6 | 44.8 |
| 7 | 861 | 5.29 | 352 | 472 | 11.4 | 20.5 |
| 8 | 146 | 5.28 | 348 | 478 | 12.3 | 19.5 |

TABLE 3

| Sample No. | CaO (ppm) | Sintered body density (Mg/m³) | μi | Bs (mT) | αμir(ppm/° C.) −40° C. to 20° C. | αμir(ppm/° C.) 20° C. to 100° C. |
|---|---|---|---|---|---|---|
| 9 | 3927 | 5.23 | 285 | 468 | 29.5 | 69.6 |
| 10 | 2104 | 5.26 | 309 | 470 | 22.9 | 45.4 |
| 11 | 1156 | 5.29 | 347 | 473 | 12.8 | 21.0 |
| 12 | 180 | 5.29 | 353 | 477 | 11.7 | 20.1 |

TABLE 4

| Sample No. | MgO (ppm) | Sintered body density (Mg/m³) | μi | Bs (mT) | αμir(ppm/° C.) −40° C. to 20° C. | αμir(ppm/° C.) 20° C. to 100° C. |
|---|---|---|---|---|---|---|
| 13 | 5035 | 5.22 | 274 | 466 | 30.1 | 71.2 |
| 14 | 1978 | 5.27 | 303 | 471 | 21.2 | 42.8 |
| 15 | 1289 | 5.28 | 344 | 475 | 12.5 | 21.3 |
| 16 | 202 | 5.30 | 350 | 479 | 12.0 | 19.9 |

Figure 5:
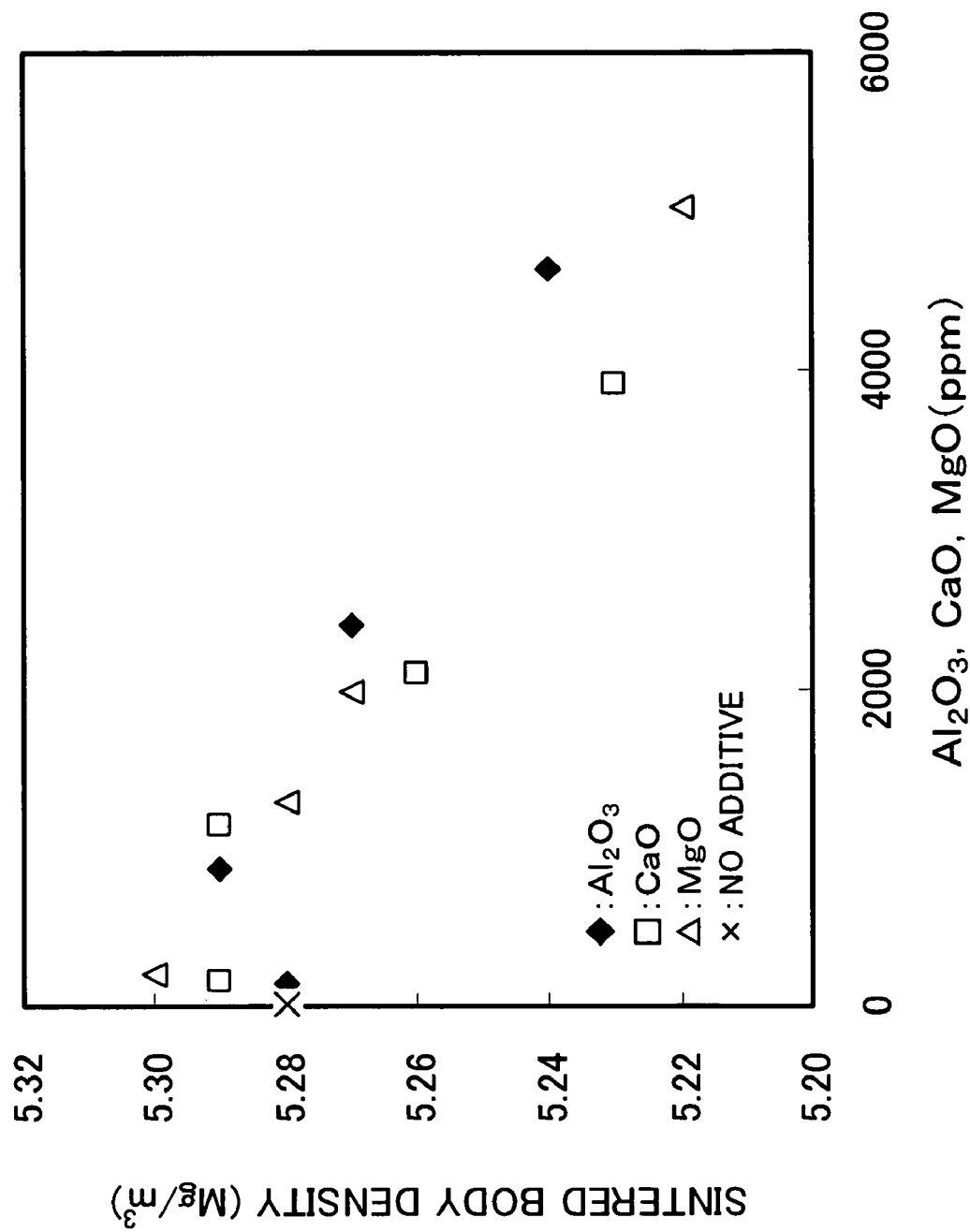
FIG. 5 is a graph showing the relations between the contents of $Al_2O_3$, CaO and MgO each in a sintered body and the sintered body density.
Figure 6:
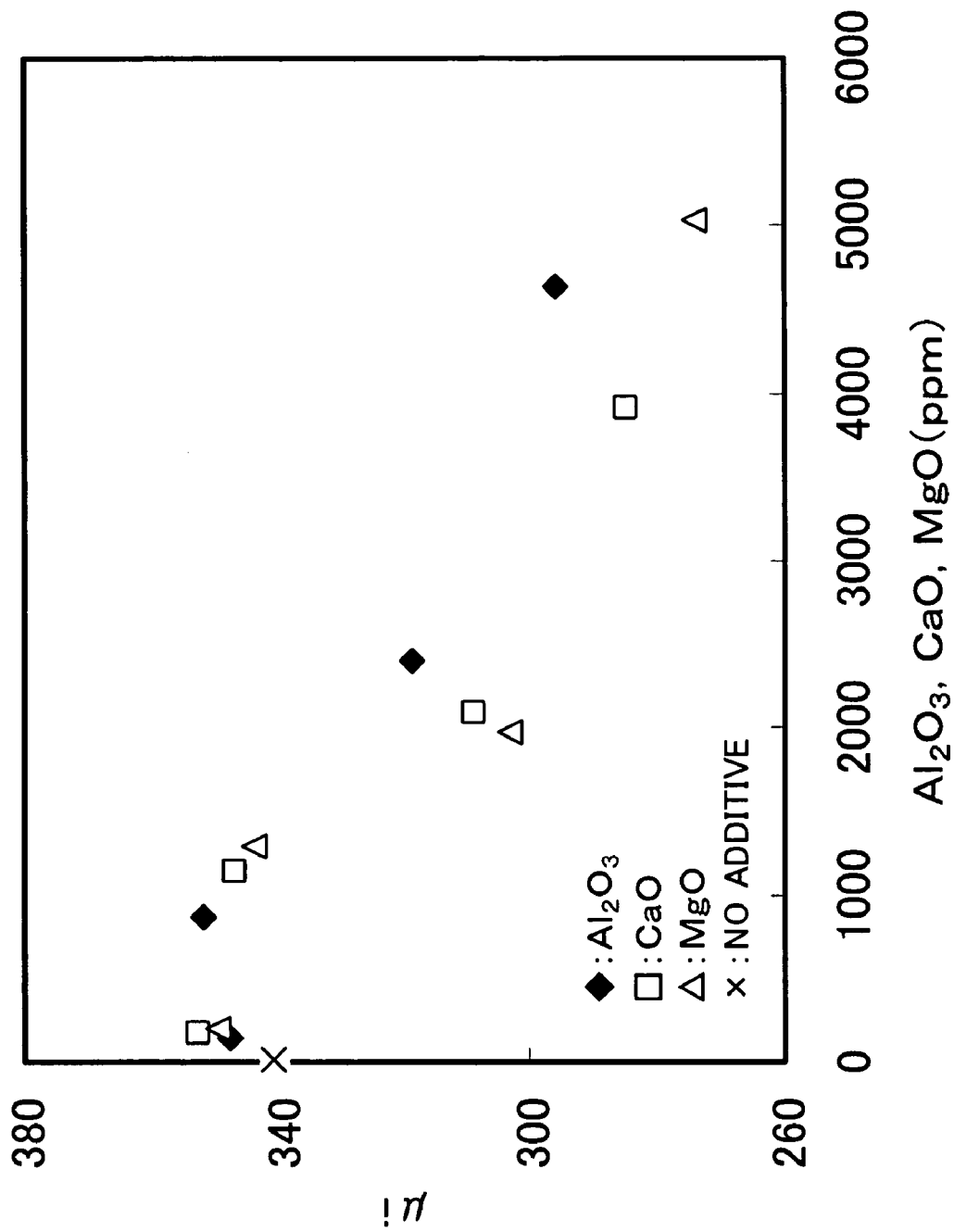
FIG. 6 is a graph showing the relations between the contents of $Al_2O_3$, CaO and MgO each in a sintered body and the initial permeability $\mu i$.
Figure 7:
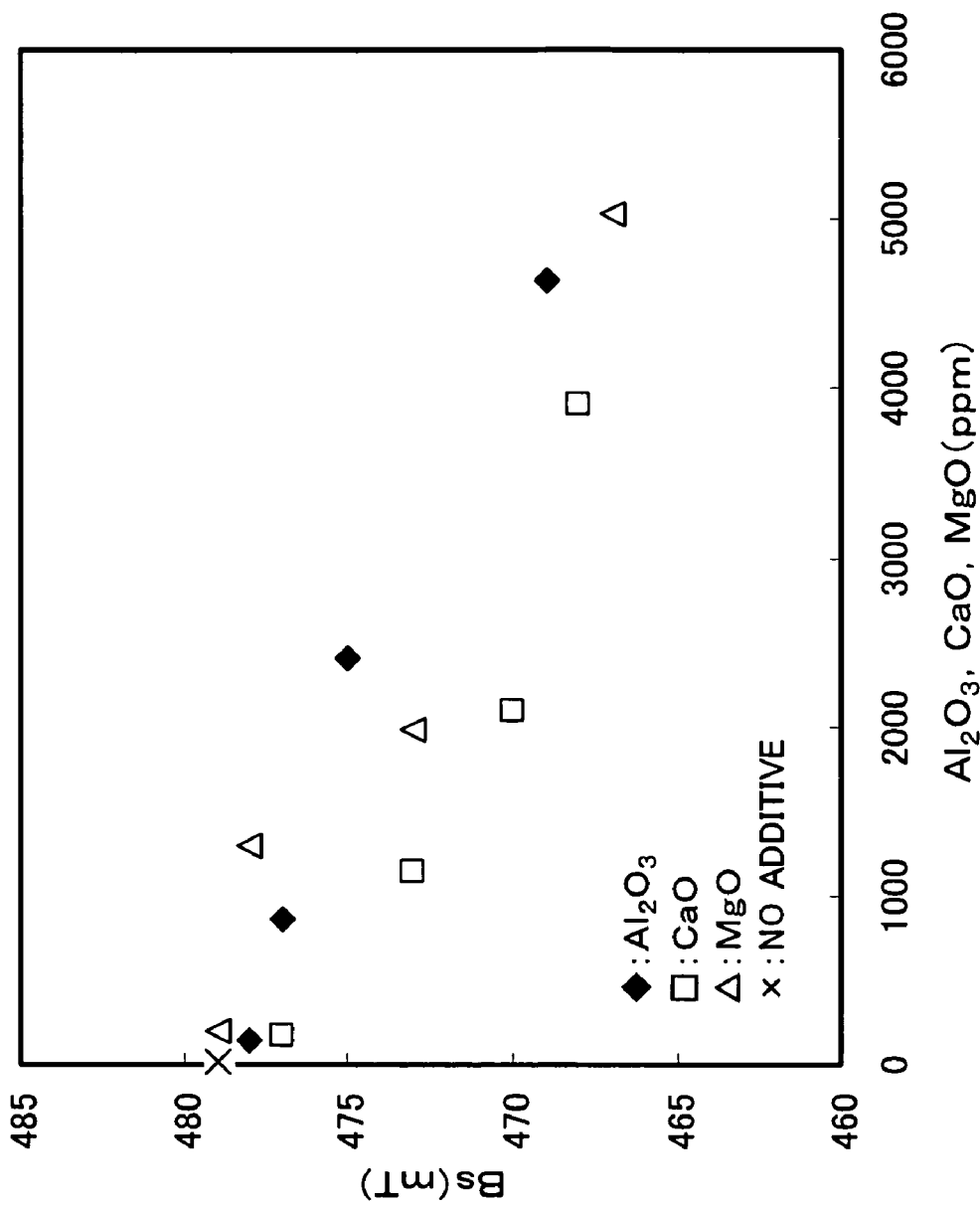
FIG. 7 is a graph showing the relations between the contents of $Al_2O_3$, CaO and MgO each in a sintered body and the saturation magnetic flux density Bs.

As can be seen from Tables 2 to 4 and FIGS. 5 to 7, when each of the contents of $Al_2O_3$, CaO and MgO (hereinafter collectively referred to as "the additive of the present invention" as the case may be) fell in a range of 1800 ppm or less, almost no decrease of the sintered body density was observed, and the initial permeability μi and the saturation magnetic flux density Bs were maintained at constant levels. It is to be noted that the contents of $P_2O_5$ in samples Nos. 5 to 16 fell in a range between 17 and 20 ppm.

FIGS. 5 to 9 show that inclusion of the additives of the present invention improved the sintered body density and the initial permeability μi, but decreased the saturation magnetic flux density Bs; in FIGS. 5 to 9, the properties of sample No. 4 in Table 1 are also shown, as indicated with the remark "no additive." It is to be noted that in the present invention, the improvement effect of the saturation magnetic flux density Bs provided by the reduction of the $P_2O_5$ content is enjoyed, and consequently the decrease of the saturation magnetic flux density Bs due to the additive of the present invention is suppressed to a minimum level.

Figure 8:
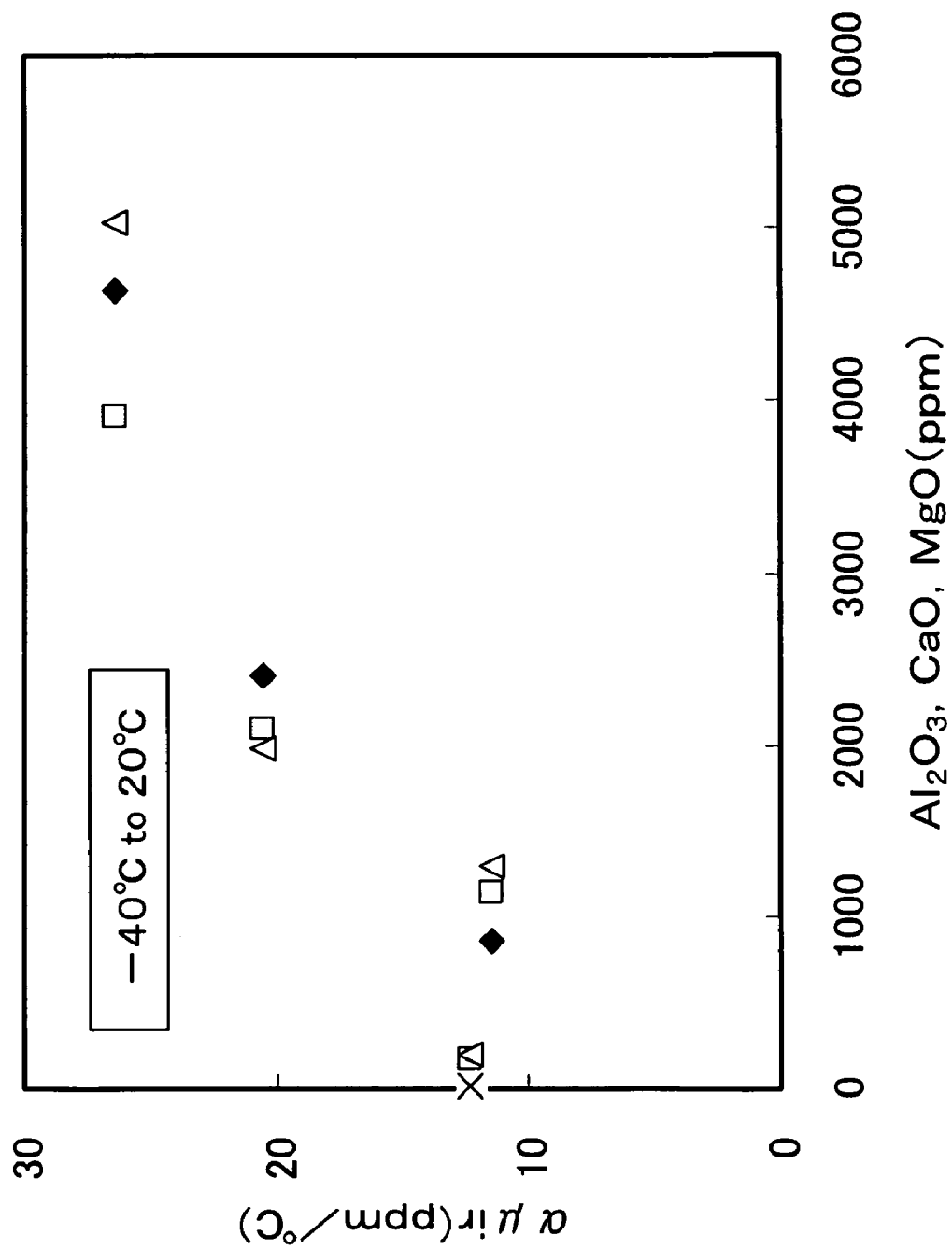
FIG. 8 is a graph showing the relations between the contents of $Al_2O_3$, CaO and MgO each in a sintered body and the temperature properties of the initial permeability, $\alpha\mu ir$ (from $-40°$ C. to $20°$ C.)
Figure 9:
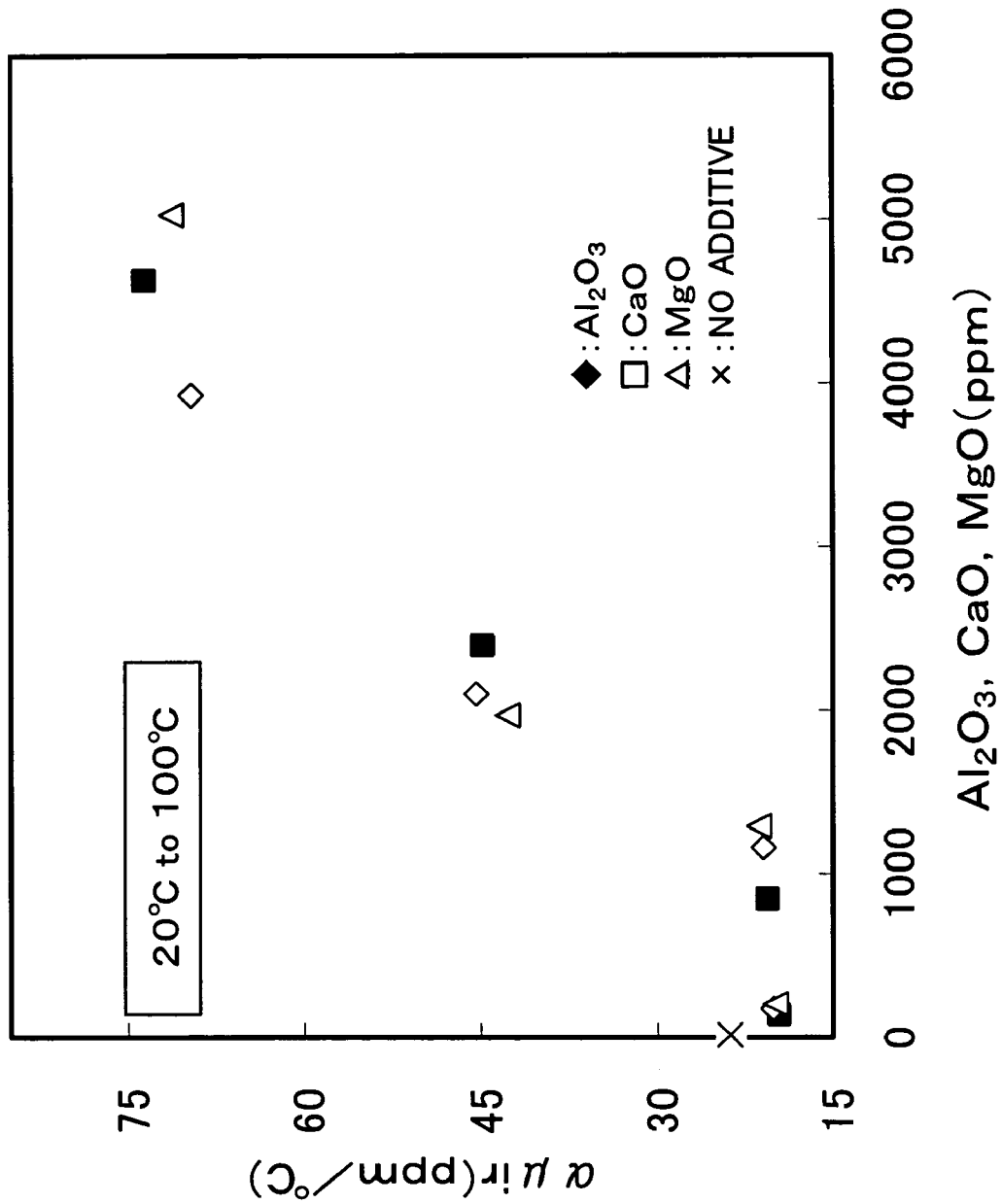
FIG. 9 is a graph showing the relations between the contents of $Al_2O_3$, CaO and MgO each in a sintered body and the temperature properties of the initial permeability, $\alpha\mu ir$ (from $20°$ C. to $100°$ C.)
Figure 10:
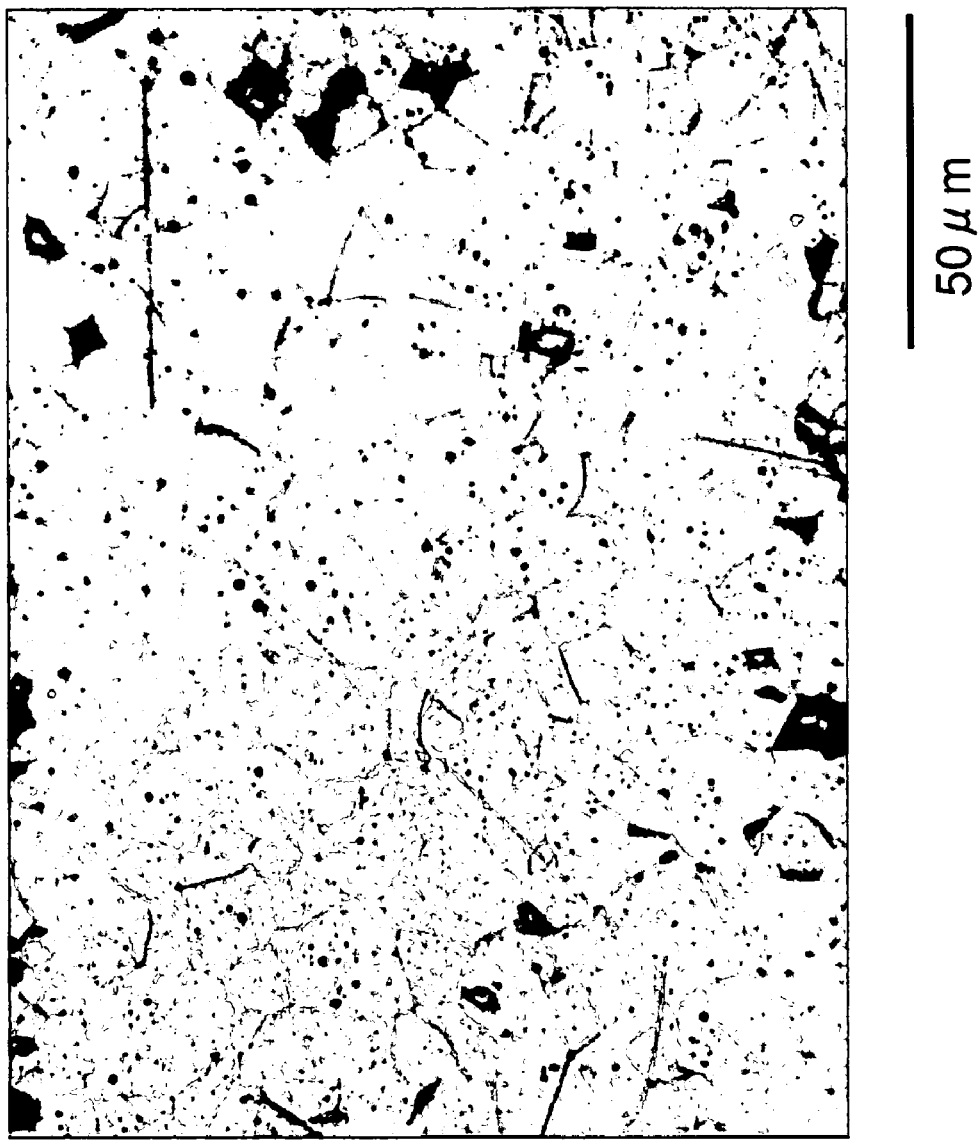
FIG. 10 is an optical microscopic image showing the structure of a sintered body (sample No. 4) containing no additives.
Figure 11:
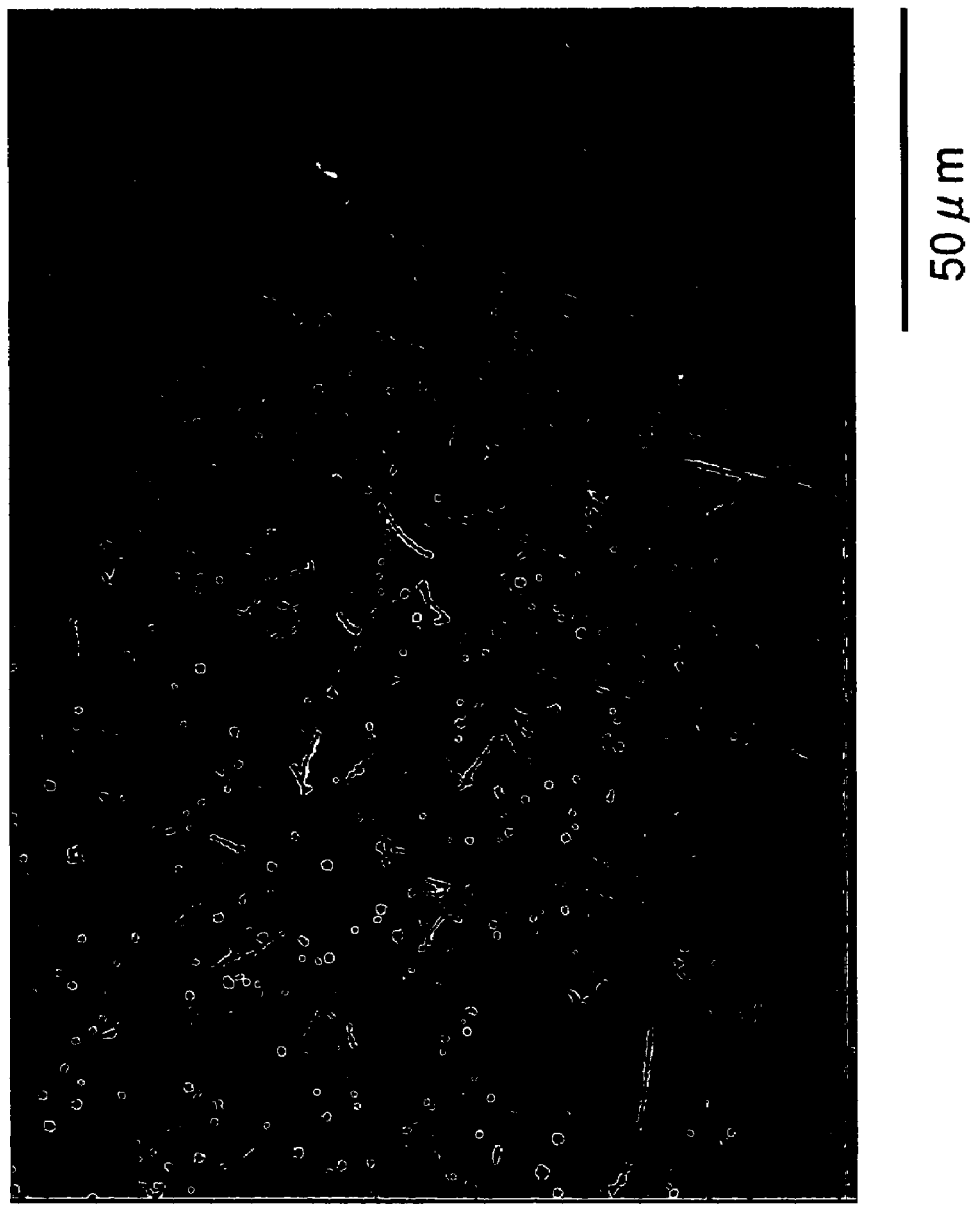
FIG. 11 is an optical microscopic image showing the structure of a sintered body (sample No. 7) containing $Al_2O_3$.
Figure 12:
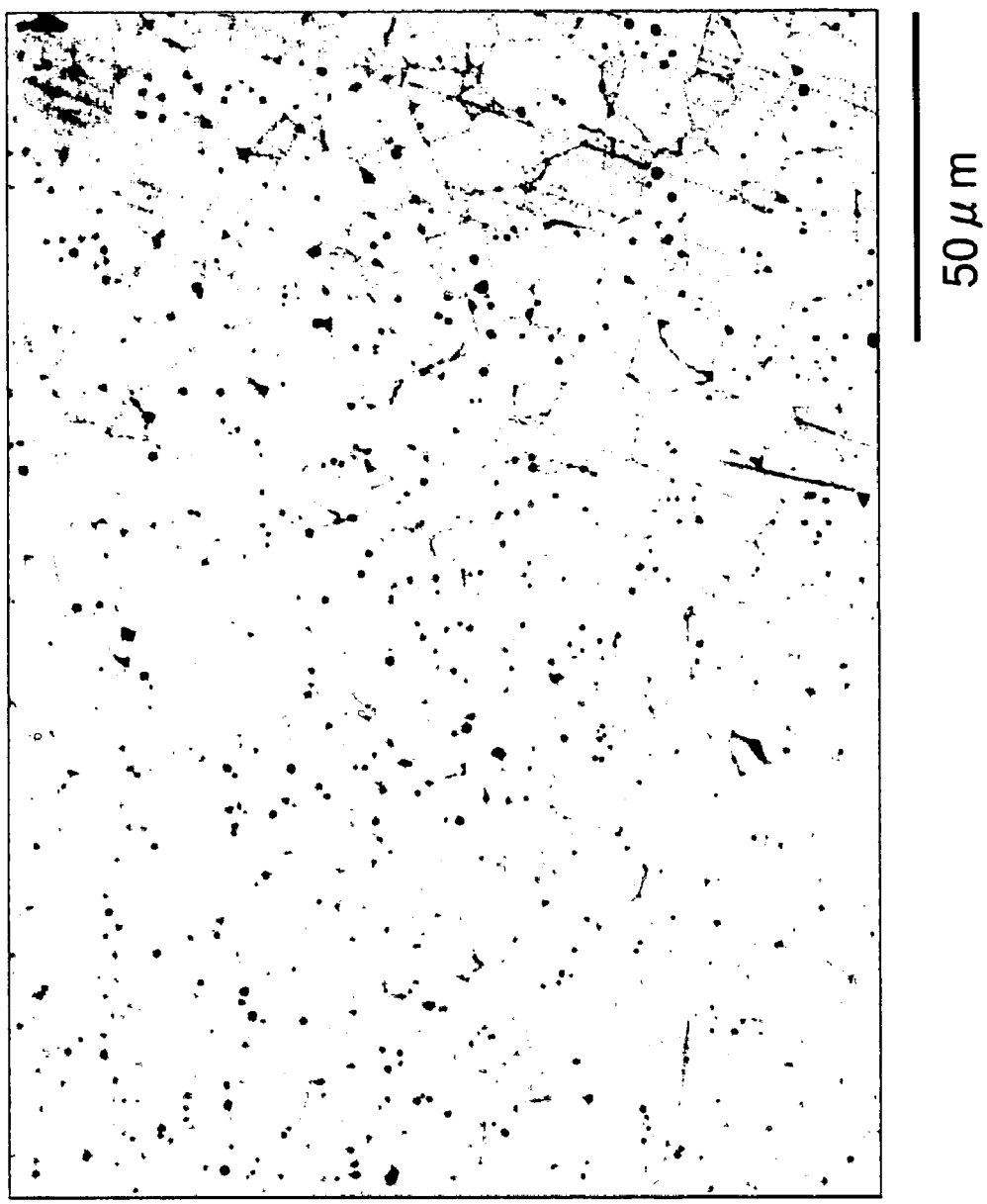
FIG. 12 is an optical microscopic image showing the structure of a sintered body (sample No. 11) containing CaO.
Figure 13:
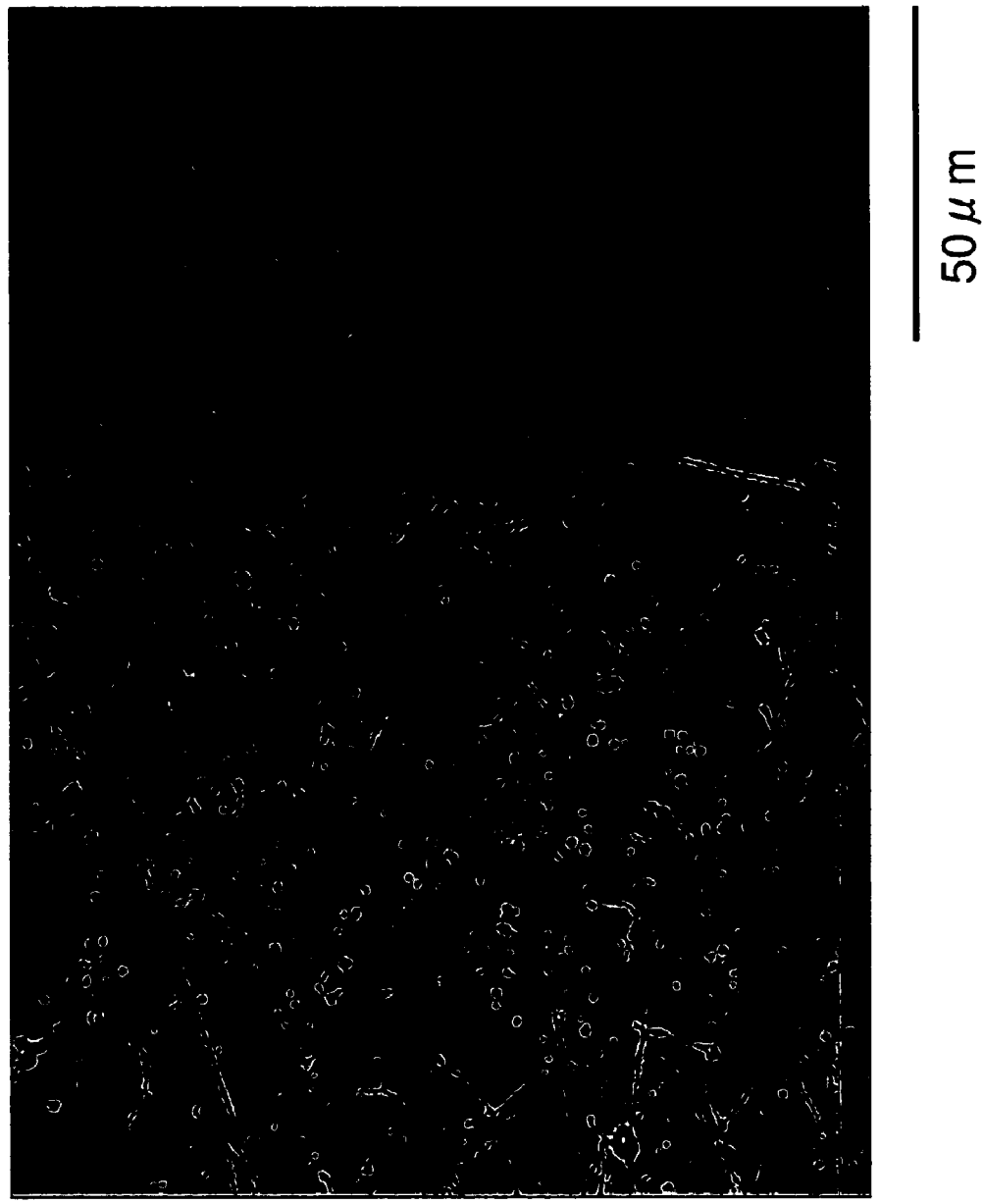
FIG. 13 is an optical microscopic image showing the structure of a sintered body (sample No. 15) containing MgO.

On the other hand, as can be seen from Tables 2 to 4 and FIGS. 8 and 9, when the content of the additive fell in a range of 1800 ppm or less, αμir were approximately constant. As can be seen from FIGS. 8 and 9, inclusion of the additive in a content range of 1800 ppm or less was able to improve αμir, in particular, αμir in a range between 20° C. and 100° C. to a better extent than no inclusion of the additive.

Table 5 shows the properties of samples Nos. 17 to 20 included the additives of the present invention. It is to be noted that samples Nos. 17 to 20 were ferrite sintered bodies produced under the same conditions as in samples Nos. 5 to 16 except for the amount of the additives.

TABLE 5

| Sample No. | $Al_2O_3$ (ppm) | CaO (ppm) | MgO (ppm) | Sintered body density (Mg/m³) | μi | Bs (mT) | αμir(ppm/° C.) −40° C. to 20° C. | αμir(ppm/° C.) 20° C. to 100° C. |
|---|---|---|---|---|---|---|---|---|
| 17 | 146 | 180 | — | 5.29 | 352 | 477 | 12.5 | 20.5 |
| 18 | 146 | — | 202 | 5.30 | 349 | 478 | 12.2 | 20.0 |
| 19 | — | 180 | 202 | 5.29 | 351 | 478 | 12.3 | 20.2 |
| 20 | 146 | 180 | 202 | 5.28 | 346 | 477 | 12.8 | 21.0 |

FIGS. 10 to 13 show the optical microscopic iamges (50×) of the microstructures of samples Nos. 4, 7, 11 and 15. On the basis of these iamges of the microstructures, the mean grain size and the standard deviation of the grain size were derived for each of the samples. The results obtained are shown in Table 6. As can be seen from Table 6, inclusion of the additive of the present invention made the grain size uniform and fine. It is understood that actualization of this uniform and fine structure improved αμir. It is to be noted that the mean grain size and the standard deviation of the grain size were measured according to the method described below.

Method for measuring the mean grain size and the standard deviation of the grain size: A section of a Ni—Cu—Zn based ferrite sintered body was polished, and then the polished section was subjected to acid etching; the etched section was observed with an optical microscope at a magnification of 50 times. The crystals on the observed image were identified and then the images of the identified crystals were input into a personal computer by use of a scanner; the crystals were recognized by use of an image analysis software, QuickL Ver 1.0 produced by Inotech Co., Ltd. From the area of each of the crystals based on the circular approximation, grain size was derived, and the mean value and the standard deviation of the grain sizes thus obtained were taken as "the mean grain size" and "the standard deviation of the grain size," respectively.

TABLE 6

| Sample No. | Mean grain size (μm) | Standard Deviation (μm) | Additive |
|---|---|---|---|
| 4 | 12.2 | 4.9 | None |
| 7 | 11.3 | 4.4 | $Al_2O_3$ |

TABLE 6-continued

| Sample No. | Mean grain size (μm) | Standard Deviation (μm) | Additive |
|---|---|---|---|
| 11 | 9.3 | 3.9 | CaO |
| 15 | 9.1 | 3.8 | MgO |

Next, the raw material of $Fe_2O_3$ used for preparation of sample No. 4 was used. Raw materials were weighed so as to give the compositions shown in Table 7. The weighed materials were added with a predetermined amount of ion-exchanged water as solvent and subjected to wet mixing for 16 hours with a steel ball mill. Each of the mixed powders thus obtained was calcined with a top temperature of 900° C. for 2 hours by using a heating furnace, and subjected to furnace cooling, and then disintegrated by using a 30-mesh sieve. Each of the disintegrated calcined substances was added with a predetermined amount of $Al_2O_3$, then finely milled for 16 hours with a predetermined amount of ion-exchanged water as solvent by using a steel ball mill. The finely milled powder in a slurry form was dried and disintegrated. Each of the finely milled powders obtained in this way was added with a 6% aqueous solution of polyvinyl alcohol as binder in a content of 10 wt % to obtain a ferrite granule material. The ferrite granule materials each were cast into a die and pressed by applying a molding pressure of 200 MPa to yield a ferrite compacted body. The obtained ferrite compacted bodies were sintered at sintering temperatures between 1150 and 1240° C. to yield ferrite sintered bodies by using a heating furnace.

The contents of $P_2O_5$ and $Al_2O_3$ in each of the obtained ferrite sintered bodies were measured by means of the flourescence X-ray spectroscopic method. The density and magnetic properties (the initial permeability μi and the temperature properties thereof, and the saturation magnetic flux density Bs) of each of the obtained ferrite sintered bodies were measured in the same manner as described above, and the results thus obtained are shown in Table 7. In any of samples Nos. 21 to 32, the content of $P_2O_5$ was found to fall within a range between 17 and 20 ppm and the content of $Al_2O_3$ was found to fall within a range between 450 and 480 ppm.

As can be seen from Table 7, the initial permeability μi was decreased with increasing content of $Fe_2O_3$, and simultaneously αμir was decreased.

TABLE 7

| Sample No. | Composition (mol %) | | | | Sintered body density (Mg/m³) | $\mu i$ | Bs (mT) | $\alpha\mu ir$(ppm/° C.) | |
|---|---|---|---|---|---|---|---|---|---|
| | $Fe_2O_3$ | NiO | CuO | ZnO | | | | −40° C. to 20° C. | 20° C. to 100° C. |
| 21 | 46.8 | 25.1 | 2.7 | 25.4 | 5.26 | 421 | 468 | 5.6 | 10.4 |
| 22 | 48.4 | 25.0 | 2.3 | 24.3 | 5.27 | 376 | 474 | 9.8 | 12.7 |
| 23 | 49.3 | 24.2 | 2.5 | 24.0 | 5.28 | 348 | 478 | 12.3 | 19.5 |
| 24 | 50.1 | 23.8 | 2.3 | 23.8 | 5.27 | 305 | 485 | 28.5 | 71.7 |
| 25 | 48.4 | 12.6 | 2.5 | 36.5 | 5.27 | 1042 | 381 | 1.7 | 4.4 |
| 26 | 48.4 | 15.5 | 2.5 | 33.6 | 5.28 | 851 | 412 | 4.0 | 7.6 |
| 27 | 48.4 | 20.5 | 2.5 | 28.6 | 5.29 | 609 | 459 | 7.9 | 10.2 |
| 28 | 48.4 | 27.0 | 2.5 | 22.1 | 5.28 | 296 | 477 | 13.0 | 18.1 |
| 29 | 49.3 | 24.2 | 3.5 | 23.0 | 5.28 | 335 | 477 | 12.4 | 20.0 |
| 30 | 49.3 | 24.2 | 5.0 | 21.5 | 5.27 | 309 | 475 | 12.8 | 20.9 |
| 31 | 49.3 | 24.2 | 8.0 | 18.5 | 5.26 | 285 | 471 | 14.7 | 23.1 |

As described above, by reducing the content of $P_2O_5$ in the sintered body, the temperature properties of the permeability of the Ni—Cu—Zn based ferrite material can be improved, without degrading the magnetic properties of the ferrite material concerned.

What is claimed is:

1. A ferrite material formed of a sintered body comprising, as main constituents, $Fe_2O_3$: 47.0 to 50.0 mol %, CuO: 1 to 5 mol %, NiO: 20 to 26 mol %, and ZnO substantially constituting the balance and its upper limit being less than 25.4 mol %, wherein said sintered body comprises:

40 ppm or less of P in terms of $P_2O_5$ and
50 to 1500 ppm of one or more additives of $Al_2O_3$ and MgO in relation to the sum of the contents of said main constituents, and
the initial permeability μi (at 100 kHz) is 320 or more;
the absolute value of $\alpha\mu ir_{-40\ to\ 20}$ is 13 ppm/° C. or less
the absolute value of $\alpha\mu ir_{20\ to\ 100}$ is 22 ppm/° C. or less and
the saturation magnetic flux density Bs (applied magnetic field: 4000 Nm) is 470 mT or more, where $$\alpha\mu ir_{-40\ to\ 20}=[(\mu i_{20}-\mu i_{-40})/\mu i_{20}^2]\times[1/T_{20}-T_{-40})],$$

$$\alpha\mu ir_{20\ to\ 100}=[(\mu i_{100}-\mu i_{20})/\mu i_{20}^2]\times[1/T_{100}-T_{20})],$$

$\mu i_{-40}$: the initial permeability at −40° C.,
$\mu i_{20}$: the initial permeability at 20° C., and
$\mu i_{100}$: the initial permeability at 100° C., wherein the mean grain size of the sintered body is 12 μm or less and the standard deviation of the grain size thereof is 4.5 μm or less, wherein said sintered body density is 5.27 Mg/m³ or more.

2. The ferrite material according to claim 1, wherein: said sintered body comprises 35 ppm or less of P in terms of $P_2O_5$.

3. The ferrite material according to claim 1, wherein: said sintered body comprises 100 to 1000 ppm of $Al_2O_3$ in relation to the sum of the contents of said main constituents.

4. The ferrite material according to claim 1, wherein:
said sintered body comprises 100 to 1000 ppm of MgO in relation to the sum of the contents of said main constituents.

5. The ferrite material according to claim 1, wherein:
the mean grain size of said sintered body is 10 pm or less.

6. The ferrite material according to claim 1, wherein: the standard deviation of the grain size thereof is 4.3 pm or less.

7. The ferrite material according to claim 1 wherein: the initial permeability μi (at 100 kHz) is 340 or more.

8. The ferrite material according to claim 1, wherein: said sintered body comprises 30 ppm or less of P in terms of $P_2O_5$.

9. The ferrite material according to claim 1, wherein: said sintered body comprises 1 to 4 mol % of CuO.

* * * * *